(12) United States Patent
Lindner et al.

(10) Patent No.: US 10,787,550 B2
(45) Date of Patent: Sep. 29, 2020

(54) COMPOSITE COMPONENTS ON THE BASIS OF HYDROPHOBIC POLYOLS

(71) Applicant: COVESTRO DEUTSCHLAND AG, Leverkusen (DE)

(72) Inventors: Stefan Lindner, Remscheid (DE); Klaus Lorenz, Dormagen (DE); Marc Schütze, Leverkusen (DE); Florian Hupka, Düsseldorf (DE); Dirk Passmann, Oberhausen (DE); Peter Nordmann, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 739 days.

(21) Appl. No.: 15/321,149

(22) PCT Filed: Jun. 25, 2015

(86) PCT No.: PCT/EP2015/064329
§ 371 (c)(1),
(2) Date: Dec. 21, 2016

(87) PCT Pub. No.: WO2015/197739
PCT Pub. Date: Dec. 30, 2015

(65) Prior Publication Data
US 2017/0152354 A1    Jun. 1, 2017

(30) Foreign Application Priority Data
Jun. 26, 2014 (EP) ..................... 14174523

(51) Int. Cl.
| | |
|---|---|
| C08J 5/04 | (2006.01) |
| C08G 18/20 | (2006.01) |
| C08G 18/42 | (2006.01) |
| C08G 18/76 | (2006.01) |
| C08G 18/09 | (2006.01) |
| C08G 18/40 | (2006.01) |
| C08G 18/48 | (2006.01) |
| F03D 1/06 | (2006.01) |

(52) U.S. Cl.
CPC ............ *C08J 5/043* (2013.01); *C08G 18/092* (2013.01); *C08G 18/2063* (2013.01); *C08G 18/4018* (2013.01); *C08G 18/4252* (2013.01); *C08G 18/4288* (2013.01); *C08G 18/4829* (2013.01); *C08G 18/7671* (2013.01); *C08J 5/041* (2013.01); *C08J 5/042* (2013.01); *C08J 5/044* (2013.01); *F03D 1/0675* (2013.01); *C08J 2375/00* (2013.01); *C08J 2375/08* (2013.01); *F05B 2230/31* (2013.01); *F05B 2280/4003* (2013.01); *Y02E 10/721* (2013.01)

(58) Field of Classification Search
None
See application file for complete search history.

(56) References Cited

U.S. PATENT DOCUMENTS

2012/0171459 A1 * 7/2012 Herbert .................. B32B 27/08
428/297.7

FOREIGN PATENT DOCUMENTS

| DE | 102009058101 | 6/2011 |
|---|---|---|
| SG | 190135 A1 | 7/2013 |
| WO | WO 2012/163845 | 12/2012 |
| WO | WO 2014/089210 | 6/2014 |

OTHER PUBLICATIONS

International Search Report and Written Opinion for International Application No. PCT/EP2015/064329, European Patent Office, dated Sep. 29, 2015.

* cited by examiner

*Primary Examiner* — Sheeba Ahmed
(74) *Attorney, Agent, or Firm* — K&L Gates LLP

(57) ABSTRACT

The present invention relates to the use of hydrophopic polyols for producing fiber composite components on the basis of a polyurethane/polyisocyanurate reaction mixture, to a method for producing composite components and to the composite components as such. The method according to the invention is particularly economical in terms of saving material and time costs and the composite components obtained are characterized by excellent visual and material properties.

12 Claims, 3 Drawing Sheets

COMPOSITE COMPONENTS ON THE BASIS OF HYDROPHOBIC POLYOLS

CROSS-REFERENCE TO RELATED APPLICATIONS

This application is a U.S. national stage application, filed under 35 U.S.C. § 371, of PCT/EP2015/064329, which was filed on Jun. 25, 2015, and which claims priority to European Patent Application No. EP 14174523.2, filed Jun. 26, 2014, the contents of which are incorporated by reference into this specification.

FIELD

The present invention relates to fiber-reinforced composite components based on a polyurethane/polyisocyanurate reaction mixture comprising hydrophobic polyols, and to a method for production thereof.

BACKGROUND

Fiber-reinforced plastics are used as construction material, since these have a high mechanical strength coupled with low weight. Fiber composite materials can be used, for example, in aircraft construction, in automobile construction or in rotor blades of wind power plants. The matrix material here typically consists of unsaturated polyester resins (UP), vinyl ester resins (VE) and epoxy resins (EP).

It is possible to utilize the known methods for production of fiber composite components, for example manual lamination, transfer molding, resin transfer molding or vacuum-assisted infusion methods, for example VARTM (vacuum-assisted resin transfer molding), or prepreg technology. Particular preference is given to vacuum-assisted infusion methods, since it is possible in this way to produce large components, as described, for example, in EP 1 310 351 A1. By means of such processes, it is possible to achieve a rapid and homogeneous spread of the resin. What is important here is that the fibers are impregnated as completely as possible with the resin material and that it does not solidify prematurely. It is crucial that the reactive resin mixture is very mobile and remains mobile for a long period in order to rapidly and completely impregnate the fibers. On the other hand, the curing time should be very short, in order to reduce the cycle time, which increases the economic viability of the method. For economic reasons, moreover, a low curing temperature is desirable, since it is thus possible to save energy costs. The finished fiber composite components should have a high thermal stability, since they can be heated significantly by sunlight, for example, and must not lose their mechanical stability in the process.

The use of polyurethane (PUR) resin or polyisocyanurate (PIR) resin for the production of composite components, for example rotor blades for the wind energy industry, is expected to have some processing and material advantages over the use of unsaturated polyester resins, vinyl ester resins and epoxy resins. These include a lower viscosity of the reaction mixture and better flow properties of the resins, and improved fatigue characteristics of the composite materials obtained.

WO 2011/081622 A1 describes polyurethane compositions for composite structures. The composite structures can be used for rotor blades of wind turbines. The OH/NCO ratio is at least 1, meaning that there are at least as many OH groups as NCO groups. Disadvantages of the method described in WO 2011/081622 A1 are the high viscosity of the reaction mixture and the short processing window, which makes the filling of large components very difficult.

WO 2013/057070 A1 describes fiber composite components for use in wind turbines, in which a polyurethane/polyisocyanurate composition (PUR/PIR) is used as polymer matrix. The ratio of the number of isocyanate groups to the number of isocyanate-reactive groups is preferably between 1.6 and 6.0.

However, PUR/PIR, by contrast with the conventional resins such as EP or UP, has the drawback that foam is formed on contact with water. This can lead to unwanted occlusions of gas or defects in the component; fiber binding could also be adversely affected. This is problematic since the materials that are frequently used for a composite core, such as balsa wood and the like, frequently contain water and hence have to be dried prior to use as core material. This is associated with a relatively high level of logistical complexity, and time and energy costs for the drying. Moreover, residual moisture still present in the balsa wood or the fibers leads to formation of foam. This phenomenon of gas occlusions is aggravated even further when the infusion is assisted by application of vacuum. However, vacuum is necessary to remove occluded gases from the laminar structure prior to the infusion, and in order to optimally impregnate or wet the fibers with the reactive resin.

SUMMARY

It was therefore an object of the present invention to provide a matrix material which can be used together with moisture-containing materials and simultaneously enables good impregnation and wetting of the fibers and rapid curing, without occurrence of the abovementioned disadvantages of the methods known from the prior art. Moreover, the composite components were to have good mechanical properties and good heat stability.

This object was surprisingly achieved by fiber composite components obtainable from fiber layers and a reaction mixture that reacts to give a polyurethane/polyisocyanurate (PUR/PIR) material, comprising at least one hydrophobic polyol.

The invention provides a fiber composite material comprising a fiber layer including polyurethane/polyisocyanurate, wherein the polyurethane/polyisocyanurate is obtainable from a reaction mixture comprising
A) an isocyanate component
B) a polyol component
C) optionally additives,
wherein the polyol component B) comprises at least one hydrophobic polyol, especially an oleochemical polyol.

The invention further provides a method for producing the composite components of the invention, comprising the following steps:
a) providing a laminar structure comprising a core, a fiber fabric, optionally a flow aid,
b) contacting the laminar structure with a reaction mixture comprising
   an isocyanate component A),
   a polyol component B),
   optionally additives C),
c) curing the reaction mixture.
   wherein the polyol component comprises at least one hydrophobic polyol, especially an oleochemical polyol.

The invention likewise provides a rotor blade for wind turbines comprising a laminar structure having the following layers:

a core and a fiber layer including polyurethane/polyisocyanurate, optionally further layers,
wherein the fiber layer including polyurethane/polyisocyanurate is obtained using a hydrophobic polyol, especially a polyether ester polyol.

The invention further provides a reaction mixture for production of core composite components by vacuum infusion, based on a polyurethane/polyisocyanurate reaction mixture comprising an isocyanate component A) and a polyol component B), wherein the reaction mixture comprises a hydrophobic polyol, especially an oleochemical polyether ester polyol, preferably in a proportion of ≥10% to ≤40% by weight, based on the total weight of the reaction mixture.

The invention further provides for the use of hydrophobic polyols, especially oleochemical polyether ester polyols, for production of polyurethane/polyisocyanurate composite materials, especially core composite components.

Suitable hydrophobic polyols are especially oleochemical polyols which have hydrophobic action by virtue of their long hydrocarbon chains. It is likewise possible here that the polyols have a (block) structure with groups which have different hydrophobic and hydrophilic action, and give rise to an overall hydrophobic character of the polyol. Oleochemical polyols are obtainable from animal or vegetable fats and oils. More particularly, this is understood to mean polyols containing, as well as hydroxyl groups, chemically incorporated fatty acid residues too. The hydroxyl groups may, for example, be end groups of polyether, polyether ester or polyester structures, but they may also be bonded directly to the fatty acid residues, whether through use of ricinoleic acid (derivatives), for example, or of fatty acids/fatty acid derivatives modified with hydroxyl groups on the fatty acid chain by a chemical route.

The invention is illustrated in detail hereinafter. Various embodiments can be combined here with one another as desired, unless the opposite is apparent to the person skilled in the art from the context.

BRIEF DESCRIPTION OF THE DRAWINGS

The present invention is further elucidated by the figures and examples which follow, but without being limited thereto. The figures show.

DETAILED DESCRIPTION

Figure 1:
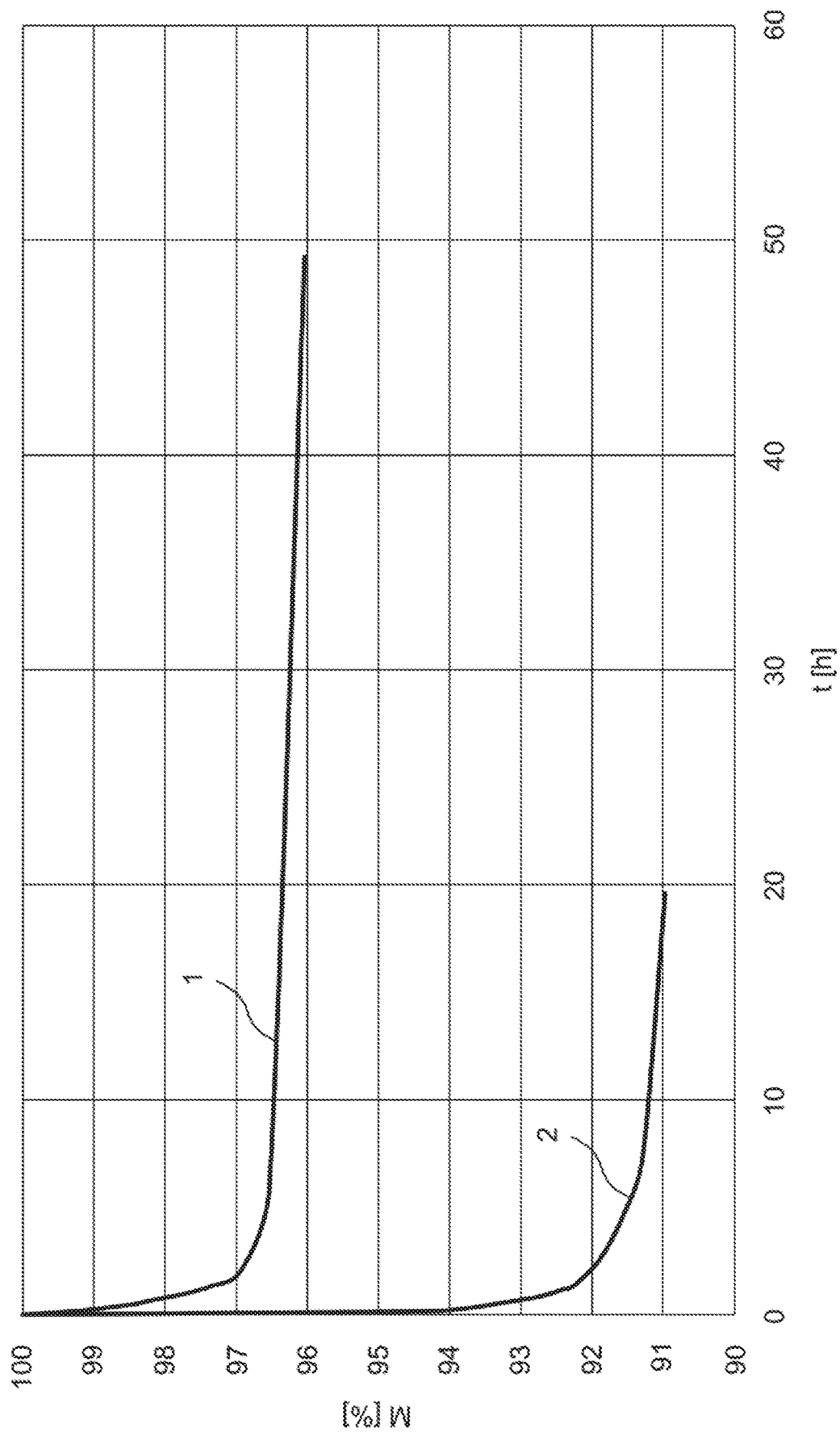
FIG. 1: Drying curves of balsa wood under reduced pressure.

The composite component preferably has a laminar structure comprising the fiber layer including PUR/PIR and further optional layers. In a preferred embodiment, the composite component here comprises a core or a spacer material layer. The core may also take the form of a core layer, or the spacer material may comprise the core, but also other spacer materials. For example, the spacer material layer consists of balsa wood, PVC foam, PET foam or PUR foam. The spacer material layer may be formed over all or part of the area of the fiber layer. In addition, it may have a different thickness across the area. Preferably, the core or the spacer material layer, at least in sections, directly adjoin the fiber layer including PUR/PIR and are firmly bonded to one another by the attachment of the core to the fiber layer including PUR/PIR. The composite component of the invention preferably has, on one of the two sides of the PUR/PIR-containing fiber layer, a spacer material layer and optionally an additional, second PUR/PIR-containing fiber layer which adjoins the spacer material layer and preferably comprises the same PUR/PIR material as the former fiber layer.

It is possible to utilize the known methods for production of fiber composite components, for example manual lamination, transfer molding, resin transfer molding or vacuum-assisted infusion methods (for example VARTM (vacuum-assisted resin transfer molding)) or prepreg technology. Particular preference is given to vacuum-assisted infusion methods.

Preferred fiber composite components have, on the other of the two sides of the former PUR/PIR-containing fiber layer, one or more protective and/or decorative layers. The protective layers are preferably one or more gelcoat layers, preferably composed of polyurethane (PUR) resins, epoxy resins, unsaturated polyester resins or vinyl ester resins. A preferred fiber composite component has, on the opposite side of the PUR/PIR-containing fiber layer from the gel coat layer, a spacer material layer, which is followed by a further PUR/PIR-containing fiber layer, preferably comprising the same PUR/PIR material as the former fiber layer.

Fiber materials used may be sized or unsized fibers, for example glass fibers, carbon fibers, steel or iron fibers, natural fibers, aramid fibers, polyethylene fibers or basalt fibers. Particular preference is given to glass fibers. Preference is given to continuous fiber-reinforced composite components which are obtained by the use of continuous fibers. The fibers may be arranged in the fiber layer unidirectionally, in random distribution or in interwoven form. In components having a fiber layer composed of multiple plies, there is the option of fiber orientation from ply to ply. It is possible here to produce unidirectional fiber layers, cross-bonded layers or multidirectional fiber layers, with unidirectional or interwoven plies layered one on top of another. Particular preference is given to using semifinished fiber products as fiber material, for example wovens, scrims, braids, mats, nonwovens, loop-drawn knits and loop-formed knits, or 3D semifinished fiber products.

The fiber content in the composite component is preferably more than 50% by weight, is more preferably more than 65% by weight, based on the total weight of the composite component. In the case of glass fibers, the fiber content can be determined subsequently by ashing, for example, or controlled in advance via the starting weights. The measurement of the fiber content by volume can be undertaken in accordance with DIN EN Iso 1887.

The fiber composite component, preferably the glass fiber composite component, is preferably clear or optically transparent, in order that the component can be visually examined for defects (e.g. air occlusions). Preferably, the glass fiber composite component has an optical transparency to ISO 13468-2 of greater than 20%, more preferably greater than 60%, most preferably greater than 80%.

The composite components of the invention can be used for production of rotor blades of wind turbines, for production of bodywork parts of automobiles, or in shipbuilding or aircraft construction, in components for building and road construction and other structures that are subject to high stress.

Preferably, the composite components produced are parts of rotor blades for wind turbines.

Rotor blades for wind turbines are generally produced in a half-shell sandwich mode, with production of one lower half and one upper half of the blade in one piece. These two halves, after they have been cured, are placed one on top of the other and bonded. The rotor blade can also be produced in one piece, as described, for example, in EP 1 310 351 A1. For reinforcement, struts or cords are bonded in as well. For the method of the invention, it is possible to utilize the known methods for production of fiber composite components. For economic production of large components such as rotor blades for wind turbines, vacuum-assisted infusion methods are particularly preferred. In a preferred embodiment, step B) of the method of the invention is conducted in a vacuum infusion method. In this way, it is generally possible to achieve a rapid and homogeneous spread of the resin.

The rate of infusion is generally dependent on the permeability of the laminar structure and can additionally be influenced by the viscosity of the resin mixture and by the pressure gradient in the infusion structure. If necessary, the infusion can be assisted by what are called flow aids (for example in the form of pressure-stable but resin-permeable mats), which are arranged upon the fiber material and can be removed again after the curing. What is important is that the fibers are impregnated as completely as possible with the resin material, in order to prevent formation of gas occlusions or micropores, which prevent efficient transmission of stress between resin and the fibers and hence lower the stability of the component. It is additionally important that the surface of a core is bound sufficiently firmly to the resin, in order that there is no detachment of the layers under stress.

Suitable materials for the core are wood or foam. Preference is given in accordance with the invention to (balsa) wood, polyvinyl chloride (PVC) foam, polyester (PET) foam or polyurethane (PUR) foam as core materials. The foam density of foamed molded cores may be within a range from 20 kg/m$^3$ to 600 kg/m$^3$, preferably 30 kg/m$^3$ to 400 kg/m and more preferably from 50 kg/m$^3$ to 200 kg/m$^3$.

Natural core materials, for example balsa wood, have a water content that varies seasonally and according to the growing region, therefore, wood processing comprises drying of wood to the moisture content of the wood for use, which is typically between 10%-15% by weight, but may also be more than 20% by weight, particularly in the case of inferior quality. It has been found that, particularly in the course of production of the components, (residual) moisture may escape from the core. This can occur, for example, as a result of the reduced pressure that exists in a vacuum infusion. Elevated temperatures, for example when the resin exhibits too high an exothermicity in the course of infusion or in the course of curing, likewise increase the probability of escape of (residual) moisture. This can result in formation of gas occlusions and defects between the layers. This is particularly disadvantageous in the case of water-sensitive resins, for example polyurethane resins, since these have a tendency to foam when they come into contact with water. Such defects in the contact region between core and resin material are particularly disadvantageous, since there can then be delamination and partial exposure of the core and significant lowering of the stability and mechanical properties of the component.

In one embodiment of the invention, the molding core has a water content of ≥0.5% by weight to ≤30% by weight, especially of ≥4% by weight to ≤15% by weight. The simplest way of determining the water content is by gravimetric means: A wood sample is taken and weighed immediately. Subsequently, it is dried to constant weight at a temperature of 103±2° C. in an oven with maximum ventilation. By the determination of the weight loss that has occurred as a result of the drying, the amount of water that was originally present in the wood body is ascertained. The exact method is standardized in DIN 52183.

It has been found that, through the use of hydrophobic polyols as a constituent of the polyol component of a PUR/PIR reaction mixture, even when moisture-containing core or fiber materials are used, it is possible to obtain virtually defect-free composite components which simultaneously have very good mechanical properties. Surprisingly, even when moist materials that are in direct contact with the PUR/PIR-containing fiber layer are used, there is no formation of bubbles or delamination of the layers, even when they are produced under method conditions under which escape of moisture is possible by virtue of the application of a reduced pressure.

This is particularly advantageous when large composite components are to be produced via vacuum infusion methods, and core materials having a natural water content (e.g. balsa wood) are being used here. This is frequently the case, for example in rotor blades for wind turbines. Without wishing to be bound to a particular theory, it is assumed that use of the hydrophobic polyol gives a polyurethane/polyisocyanurate which exhibits hydrophilicity/hydrophobicity characteristics that are advantageously balanced overall: Firstly, the absorption of water into the polyurethane/polyisocyanurate is reduced, such that there is no unwanted water-isocyanate reaction resulting in $CO_2$ formation; on the other hand, the phases do not separate in such a complete manner that turbidity and/or streaks form in the finished component, the fibers are incompletely wetted and unwetted sites could occur in the laminate structure, or that an aqueous interphase could form between the layers, which could then lead to partial or even complete delamination.

One advantage of the reaction mixture of the invention is that the core or fiber materials having a high natural water content and/or significant water reabsorption capacity that are to be used do not have to be dried separately and the composite components obtained have a high quality and advantageous mechanical properties. Surprisingly, the composite components obtained also have particularly high heat stability.

The hydrophobic polyol used in accordance with the invention has a number-average molecular weight of ≥150 g/mol, preferably of ≥250 g/mol and ≤12000 g/mol, more preferably of ≥300 g/mol and ≤6000 g/mol and most preferably of ≥350 g/mol and ≤4500 g/mol. The mean hydroxyl functionalities of the hydrophobic polyols are preferably between 2 and 7.

The number-average molar mass and the hydroxyl functionality (F-OH) are associated with one another according to the relationship shown in equation (1) via the OH number which can be determined via titration, for example in accordance with DIN 53240.

$$\text{OH number [mg KOH/g]} = (F\text{-OH} \times 56100 \text{ [mg KOH/mol]})/(\text{molar mass [g/mol]}) \quad (1)$$

Preference is given in accordance with the invention to using polyether ester polyols as hydrophobic polyols. Polyether ester polyols are understood in accordance with the invention to mean those polyols having a chemical structure including both ether and ester groups. The polyether ester polyols may, as well as the aforementioned structural elements, in principle include all the components known to those skilled in the art from this substance class. Particular preference is given to using polyether ester polyols obtainable on the basis of renewable raw materials, especially oleochemical starting materials. Very particular preference is given to using polyether ester polyols based on fatty acid esters.

The umbrella term "fatty acid esters" refers hereinafter to fatty acid glycerides, especially fatty acid triglycerides, and or fatty acid esters based on other mono- and polyfunctional alcohols. The fatty acid residues (acyl residues) of the fatty acid esters may, as is the case in castor oil, themselves bear hydroxyl groups. The fatty acid residues may likewise have been subsequently modified with hydroxyl groups. Fatty acid residues that have been modified in this way can be obtained, for example, by epoxidation of the olefinic double bonds and subsequent ring opening of the oxirane rings with nucleophiles or by hydroformylation/hydrogenation. It is also possible to treat unsaturated oils with atmospheric oxygen for this purpose, frequently at elevated temperature.

Polyether ester polyols usable in accordance with the invention are obtainable, for example, by reaction of polyether polyols under transesterification conditions with fatty acid esters, as described, for example, in DE 19604177, or DE 19812174, or by direct esterification of fatty acids with polyether polyols. It is likewise possible to obtain the polyether ester polyols usable in accordance with the invention by reaction of castor oil with alkylene oxides according to the teaching of DE 3323880, WO 2004020497 A1 or JP 05163342. It is also possible to chemically react fatty acid esters modified with hydroxyl groups, as described, for example, in EP 1790678 A1, subsequently with alkylene oxides. According to the teaching of WO 2004096882 and WO 2004096883, it is also possible to transesterify hydroxymethylated fatty acid esters with polyfunctional polyols.

In a preferred embodiment of the invention, polyether ester polyols obtainable by base-catalyzed reaction of starter compounds having Zerewitinoff-active hydrogen atoms with alkylene oxides in the presence of fatty acid esters are used. These are especially the polyether ester polyols that are known per se, as obtainable, for example, according to the teachings of EP 1923417 A1 and EP 2177555 A1 in base-catalyzed one-pot one-step methods. Preference is given to preparing the polyether ester polyols using fatty acid esters wherein the fatty acid residues do not have any free OH groups.

Starter compounds in the context of the invention are understood to mean compounds having at least one Zerewitinoff-active hydrogen atom. Hydrogen bonded to N, O or S is referred to as Zerewitinoff-active hydrogen (or as "active hydrogen") when it affords methane by reaction with methylmagnesium iodide, by a method discovered by Zerewitinoff. Typical examples of compounds having Zerewitinoff-active hydrogen are compounds containing carboxyl, hydroxyl, amino, imino or thiol groups as functional groups.

Preferred starter compounds having Zerewitinoff-active hydrogen atoms for the preparation of the polyether ester polyols are, as well as hydroxy-functional starters, also amino-functional starters. The starters usually have functionalities of 2 to 8, but in particular cases also functionalities up to 35. The molar masses thereof are from 17 g/mol to about 1200 g/mol. Preferred starters have functionalities of not less than 3. Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea, and Mannich bases. It is also possible to use high-functionality starter compounds based on hydrogenated starch hydrolysis products. These are described, for example, in EP-A 1 525 244. Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane. In addition, starter compounds used may also be ring-opening products of cyclic carboxylic anhydrides and polyols. Examples are ring-opening products formed from phthalic anhydride, succinic anhydride or maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand. It is of course also possible to use mixtures of various starter compounds. Particularly preferred starter compounds are selected from the group consisting of propylene glycol, ethylene glycol, butanediol, hexanediol, dodecanediol, glycerol, trimethylolpropane, sorbitol and sucrose.

Suitable alkylene oxides are, for example, ethylene oxide, propylene oxide, 1,2-butylene oxide or 2,3-butylene oxide and styrene oxide. Preference is given to propylene oxide and ethylene oxide. If the alkylene oxides are metered in successively, the products produced contain polyether chains having block structures. Products having end blocks consisting of oxyethylene units are characterized, for example, by elevated concentrations of primary end groups, which impart elevated isocyanate reactivity to the systems. Preferred polyether ester polyols have a high proportion of oxypropylene units. In a preferred embodiment, polyether ester polyols based on propylene oxide are used.

Suitable fatty acid esters are, for example, cottonseed oil, groundnut oil, coconut oil, linseed oil, palm kernel oil, olive oil, corn oil, palm oil, castor oil, lesquerella oil, rapeseed oil, soybean oil, sunflower oil, jatropha oil, herring oil, sardine oil and tallow. Likewise suitable are fatty acid esters of other mono- or polyfunctional alcohols, and fatty acid glycerides having fewer than 3 fatty acid residues per glycerol molecule. The fatty acid (tri)glycerides and the fatty acid esters of other mono- and polyfunctional alcohols can also be used in a mixture. Preference is given to polyether ester polyols based on fatty acid esters having no OH groups in the fatty acid residues, for example fatty acid esters based on lauric acid, myristic acid, palmitic acid, stearic acid, palmitoleic acid, oleic acid, erucic acid, linoleic acid, linolenic acid, eleostearic acid or arachidonic acid, or mixtures thereof. Very particular preference is given to fatty acid triglycerides having no OH groups in the fatty acid residues, especially soybean oil and rapeseed oil.

Suitable catalysts for preparation of the polyether ester polyols are basic catalysts, for example alkali metal/alkaline earth metal hydroxides, especially potassium hydroxide, and the carboxylic salts thereof, and also aliphatic or aromatic amines.

In a preferred embodiment of the invention, a polyether ester polyol having a content of fatty acid residues of 5% to 85% by weight, preferably 20% to 60% by weight, based on the total weight of the polyether ester polyol, is used.

Hydrophobic polyols used are preferably polyether ester polyols having an OH number of ≥28 to ≤900 mg KOH/g, more preferably of ≥56 to ≤600 mg KOH/g and most preferably of ≥100 to ≤500 mg KOH/g. Preferred polyether ester polyols have OH functionalities of ≥1.5 to ≤6, more preferably of ≥1.7 to ≤5 and most preferably of ≥2 to ≤4.

The calculation of the functionality of the hydrophobic polyether ester polyols known from EP 1923417 A1 and EP 2177555 A1 is calculated from the (number-average) functionality of the starter compound(s) containing Zerewitinoff-active hydrogen atoms ($F_S$) and any number-average hydroxyl functionality present in the fatty acid ester(s) used ($F_F$) according to equation (2).

$$(F_S*\text{moles of starter compound}+F_F*\text{moles of fatty acid ester})/(\text{moles of starter+moles of fatty acid ester}) \quad (2)$$

A hydrophobic polyether ester polyol obtained by base-catalyzed reaction of 2 mol of sorbitol ($F_S$=6) and 3 mol of soybean oil ($F_F$=0) and alkylene oxides accordingly has, for example, the functionality of 2.4. Correspondingly, a hydrophobic polyether ester polyol prepared on the basis of 2.14 mol of glycerol, 0.71 mol of soybean oil and alkylene oxides has a functionality of 2.3. The viscosities of the hydrophobic polyether ester polyols can vary within wide limits. They are generally in the range from 50 to 15 000 mPas at 25° C., preferably in the range from 50 to 7000 mPas at 25° C. and more preferably in the range from 80 to 1500 mPas at 25° C. Most preferably, the viscosity of the hydrophobic polyether ester polyols for use in accordance with the invention is in the range from 80 to 600 mPas at 25° C.

Polyol components B) used may, in accordance with the invention, also be mixtures of different hydrophilic polyols. According to the invention, the polyol component contains at least one hydrophobic polyol and may additionally also contain further polyol components.

According to the invention, further polyols used may be polyether polyols, polyester polyols, polycarbonate polyols or other non-hydrophobic polyether ester polyols, preference being given to polyether polyols. Polyether polyols usable in accordance with the invention are, for example, polytetramethylene glycol polyethers, as obtainable by polymerization of tetrahydrofuran by means of cationic ring opening. Polyether polyols that are likewise suitable are addition products of styrene oxide, ethylene oxide, propylene oxide and/or butylene oxides onto di- or polyfunctional starter molecules. Suitable starter compounds have already been described in preceding paragraphs. Preference is given to glycerol as starter. The viscosity of the polyols is preferably ≤800 mPas (at 25° C.). The polyols preferably have at least 60% secondary OH groups, preferably at least 80% secondary OH groups and more preferably at least 90% secondary OH groups. Polyether polyols based on propylene oxide are particularly preferred. Preferably, the polyols used in addition have a mean functionality of 2.0 to 5.0, more preferably 2.5 to 3.5.

If component B used is exclusively a hydrophobic polyol, the OH number of component B is equal to the OH number of the hydrophobic polyol. If component B used is a mixture of at least one hydrophobic polyol and other polyols, the OH number of component B is equal to the weight average of the OH numbers of the individual components.

The polyols B) may also contain fibers, fillers and polymers, for example in finely dispersed form.

The proportion of the hydrophobic polyol is preferably ≥20% by weight, more preferably ≥50% by weight and most preferably ≥75% by weight of the polyol component B). Preferably, the proportion of the hydrophobic polyol is ≥50% and ≤100% by weight, preferably ≥75% and ≤100% by weight, of the polyol component B).

The reaction mixture of the invention further comprises an isocyanate component A). Isocyanate components A) used are the customary aliphatic, cycloaliphatic and especially aromatic di- and/or polyisocyanates. Examples of such suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer composition, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or the higher homologs (pMDI), 1,3- and/or 1,4-bis(2-isocyanatoprop-2-yl)benzene (TMXDI), 1,3-bis(isocyanatomethyl)benzene (XDI). As well as the aforementioned polyisocyanates, it is also possible to use proportions of modified polyisocyanates having uretdione, isocyanurate, urethane, carbodiimide, uretonimine, allophanate or biuret structure. Isocyanates used are preferably diphenylmethane diisocyanate (MDI) and especially mixtures of diphenylmethane diisocyanate and polyphenylene polymethylene polyisocyanate (pMDI). The mixtures of diphenylmethane diisocyanate and polyphenylene polymethylene polyisocyanate (pMDI) have a preferred monomer content of between 60% and 100% by weight, preferably between 70% and 95% by weight, more preferably between 80% and 90% by weight. The NCO content of the polyisocyanate used should preferably exceed 25% by weight, preferably 30% by weight, more preferably 32% by weight. The NCO content can be determined to DIN 53185. The viscosity of the isocyanate should preferably be ≤150 mPas (at 25° C.), preferably ≤50 mPas (at 25° C.) and more preferably ≤30 mPas (at 25° C.).

The proportion of the hydrophobic polyol is preferably ≥10% and ≤40% by weight, more preferably ≥15% and ≤35% by weight, of the reaction mixture.

The reaction mixtures used in accordance with the invention have low viscosities, long processing windows and short curing times at low curing temperatures, and hence enable the rapid manufacture of fiber composite components.

A further advantage of the reactive resin mixtures used in accordance with the invention is their improved processing characteristics. The reactive resin mixtures can be produced and processed at low temperatures. The components of the reactive resin mixtures can be mixed at 20 to 50° C., preferably at 30 to 40° C., and applied to the fiber material.

In order to assure good impregnation of the fibers, the reactive resin mixture in the filling operation should preferably be mobile and remain mobile for a maximum period. This is necessary particularly in the case of large components, since the filling time here is very long, for example up to one hour. Preferably, the viscosity of the reactive resin mixture of the invention at 25° C., directly after mixing, is between 10 and 300 mPas, preferably between 30 and 100 mPas, more preferably between 45 and 85 mPas. Preferably, the viscosity of the reactive resin mixture of the invention, at a constant temperature of 25° C., does not rise above 1000 mPas within 60 minutes after the mixing of the components; more preferably, the viscosity, at a constant temperature of 25° C., after 60 minutes is in the range from 50 to 500 mPas, most preferably in the range from 50 to 400 mPas. The viscosity can be determined 60 minutes after the mixing of the components at a constant temperature of 25° C. with a rotary viscometer at a shear rate of 60/s.

The reaction mixture used in accordance with the invention can be processed in casting machines with static mixers or with dynamic mixers, since only a short mixing time is required. This also constitutes an advantage for economic viability.

In the context of the invention, the term "polyurethane/polyisocyanurate reaction mixture" (PUR/PIR reaction mixture) refers to a reaction mixture which reacts to give polyurethane and/or polvisocyanurate structures. PUR/PIR is understood to mean those polyurethanes which contain urethane structures and optionally isocyanurate structures. NCO index, or index, refers to the molar ratio of all NCO groups present in the reaction system to all NCO-reactive groups present in the reaction system, i.e. the numerical ratio of the reactive groups of components A) and B). The NCO index is preferably ≥0.95, more preferably ≥1.10 to ≤10.00, even more preferably ≥1.60 to ≤6.00.

The PUR/PIR material obtained preferably has a PIR conversion of more than 20%, preferably more than 40% and more preferably more than 60%. The PIR conversion is the proportion of isocyanate groups which has reacted to give PIR structures. It can be detected by infrared spectroscopy.

The catalysts customary in polyurethane chemistry are appropriately added to the PUR/PIR reaction mixture. Preferably, the reaction mixture of the invention comprises crosslinking catalysts. It is possible to use the crosslinking catalysts known to those skilled in the art, for example tertiary amines and organic metal compounds such as dibutyltin dilaurate.

Particular preference is given to catalysts which also catalyze trimerization. These too may be bases (tertiary amines, salts of weak acids such as potassium acetate) and/or organic metal compounds. Trimerization catalysts initiate and accelerate the trimerization of isocyanate groups to isocyanurate groups.

In a further embodiment of the method of the invention, the polyurethane/polyisocyanurate reaction mixture comprises a thermolatent-reactive trimerization catalyst. Particular preference is given to using latent-reactive trimerization catalysts which only start to initiate and accelerate the trimerization of isocyanate groups to isocyanurate groups at 50 to 100° C.

Preferably, the trimerization catalyst is a salt of a tertiary amine.

It is preferable here that the tertiary amine is selected from the group consisting of trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, triisopropanolamine, triethylenediamine, tetramethylbutane-1,3-diamine, N,N,N',N'-tetramethylethylenediamine, N,N,N',N'-tetramethylhexane-1,6-diamine. N,N,N',N',N"-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine. N-(2-dimethylaminoethyl)morpholine, 1-methyl-4-(2-dimethylamino)piperidine, 1,4-diazabicyclo[2.2.2]octane, 1,8-diazabicyclo[5.4.0]undec-7-ene and/or 1,5-diazabicyclo[4.3.0]-5-nonane.

It is likewise preferable that the salt is selected from the group consisting of phenoxides, ethylhexanoates, oleates, acetates and/or formates.

It has been found that, surprisingly, these latent-reactive polyurethane (PUR) catalysts also catalyze the formation of polyisocyanurate (PIR) at elevated temperature. This enables the production of large fiber composite components, since polyisocyanate formation is yet to occur at the filling temperature and the molds filled with fibers can be impregnated rapidly because of the low viscosity, and curing is effected only in the later treatment.

Examples of commercially available latent-reactive trimerization catalysts are Polycat® SA1/10 (phenol-blocked 1,8-diazabicyclo[5.4.0]undec-7-ene (=DBU)), Polycat, SA 102/10, DABCO® 8154 (formic acid-blocked triethylenediamine) or DABCO® WT.

A particularly preferred trimerization catalyst is 1,8-diazabicyclo[5.4.0]undec-7-ene, which is present as the phenoxide salt, ethylhexanoate salt, oleate salt, acetate salt or formate salt.

Particular preference is given to a fiber composite component having, in the fiber layer, a polyurethane/polyisocyanurate matrix which has been obtained from ≥60% and ≤90% by weight, preferably ≥65% and ≤85% by weight, of polyisocyanates (A), ≥10% and ≤40% by weight, preferably ≥15% and ≤35% by weight, of polyols (B), ≥0.01% and ≤2% by weight, preferably ≥0.1% and ≤1% by weight, of trimerization catalysts, where the sum total of the proportions by weight is 100% by weight.

With regard to the reaction mixture, preference is given to the combination of a hydrophobic polyol, especially of a polyether ester polyol containing fatty acid residues without free OH groups, with a glycerol-started polypropylene oxide polyol having a functionality of 3, with a latent-reactive trimerization catalyst, especially the phenol salt of 1,8-diazabicyclo[5.4.0]undec-7-ene, and MDI.

The polyurethane/polyisocyanurate mixture obtained preferably has a strength in the tensile test to DIN EN ISO 527 of more than 70 MPa, preferably more than 75 MPa, in order to withstand the high mechanical stresses in components such as a rotor blade, for example.

The polyurethane/polyisocyanurate mixture obtained preferably has a modulus of elasticity in the tensile test to DIN EN ISO 527 of more than 2500 MPa, preferably more than 2600 MPa, in order to withstand the high mechanical stresses in components such as a rotor blade, for example.

The polyurethane/polyisocyanurate mixture obtained preferably has a heat distortion resistance (HDT) to DIN EN ISO 75-1/75 2004, Method A, with a flexural stress of 1.8 N/mm$^2$, of more than 70° C., preferably more than 75° C., more preferably more than 80° C., most preferably more than 90° C., in order to withstand the high thermal stresses in components.

The fiber composite components of the invention can be used for production of rotor blades of wind turbines, for production of bodywork parts of automobiles, or in aircraft construction, in components for building and road construction (for example manhole covers) and other structures that are subject to high stress.

FIG. 1 shows the decrease in weight of balsa wood samples resulting from drying under reduced pressure. The temperature at which the drying was conducted was 23° C. Curve 1 describes the profile at a reduced pressure of 50 mbar, curve 2 the profile at a reduced pressure of 20 mbar. These experiments make clear how much water balsa wood can contain.

Figure 2:
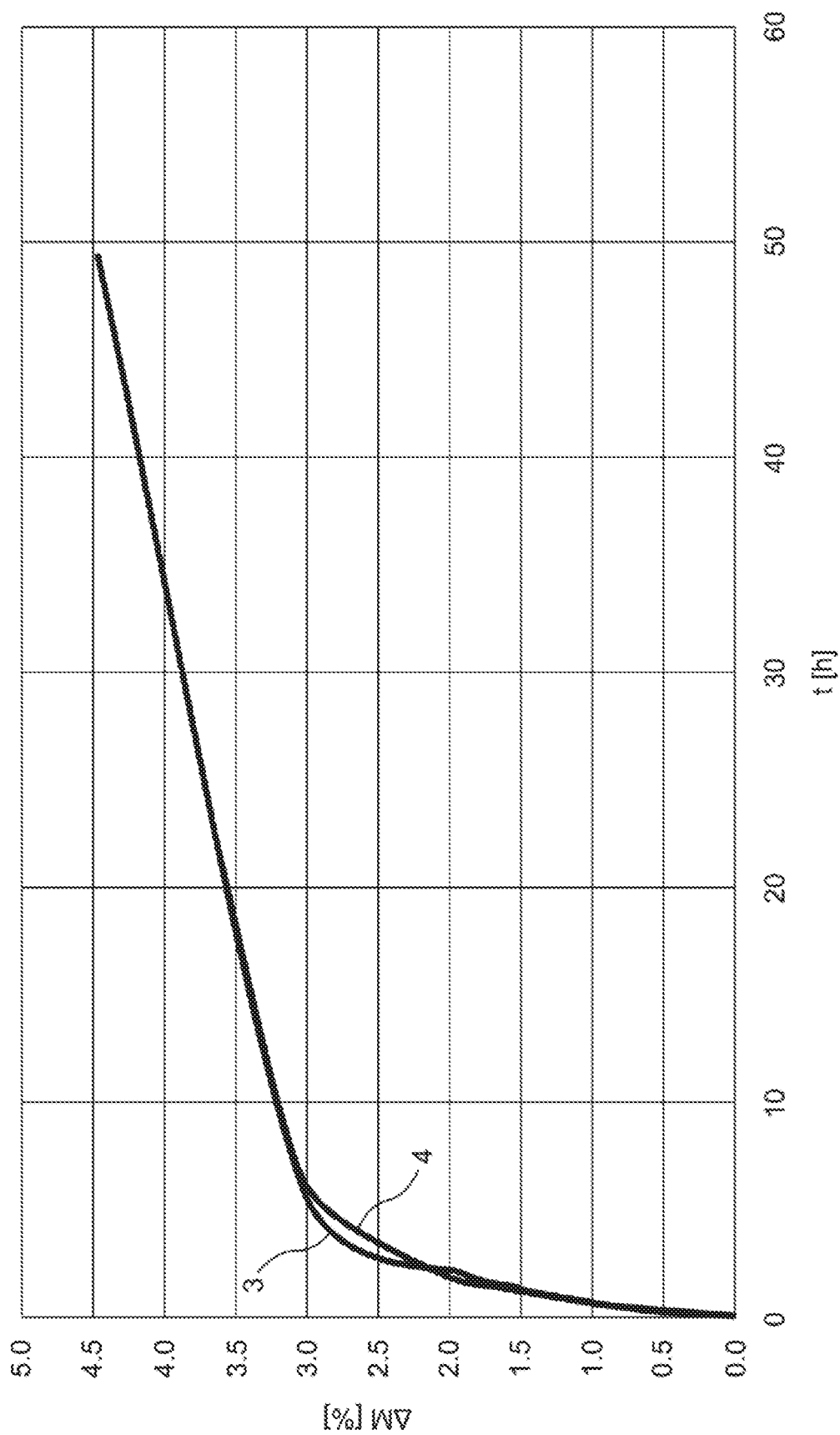
FIG. 2: Increases in weight of dried balsa wood as a result of air humidity.

FIG. 2 shows the absorption of moisture from the air by previously dried balsa wood samples. Curve 3 relates to a sample previously dried at 20 mbar, curve 4 to a sample previously dried at 50 mbar. These curves show that it is insufficient to dry balsa wood cores just once in order to keep them permanently free of water. They will absorb moisture again from the ambient air.

Figure 3:
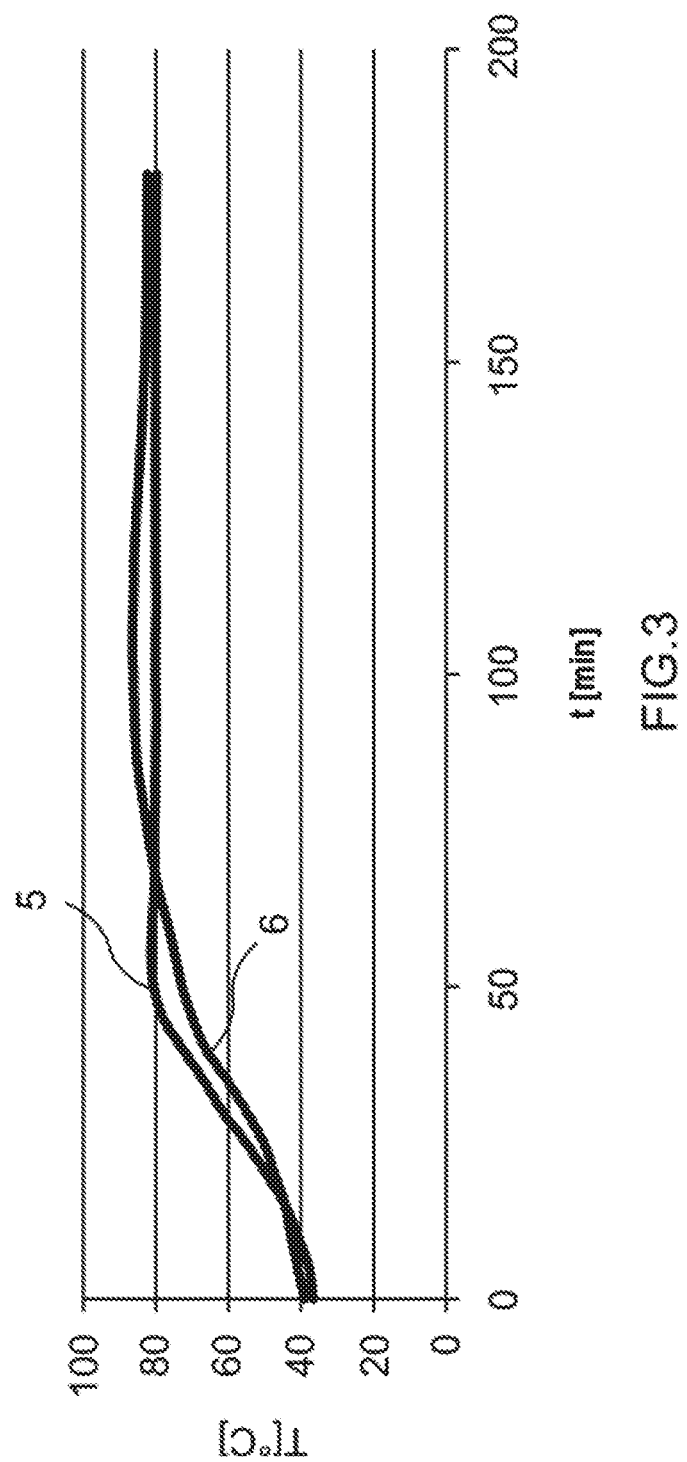
FIG. 3: The evolution of temperature within an infusion structure over time.

FIG. 3 shows the evolution of temperature within an infusion structure over time. After the infusion, the infusion structure was positioned in a heating cabinet that was not heated at first. The heating cabinet was then heated at a heating rate of 1° C./min. Curve 5 shows the oven temperature, and curve 6 the temperature of the infusion structure. It can be seen that the exothermicity that arises allows the temperature of the structure to rise to slightly above 80° C.

The invention is to be illustrated in detail by the examples which follow.

EXAMPLES

Starting Compounds:

Polyether Ester Polyol 1: Preparation Method 197.0 g of glycerol and 7.793 g of a 46.44% by weight aqueous KOH solution were dewatered in a 2 L laboratory autoclave at 110° C., a stirrer speed of 200 rpm (cross-beam stirrer) and applied vacuum with simultaneous introduction of 50 mL of nitrogen per minute over a period of 3.0 h. In the course of this, towards the end of the dewatering period, a pressure of 100-120 mbar was established. Thereafter, the mixture was cooled down to 50° C., and 620.7 g of soybean oil were added. After the filling stub had been sealed, oxygen was removed by charging the apparatus with 3.0 bar of nitrogen and then releasing the elevated pressure to atmospheric pressure three times each. After heating up again to 110° C., 383 g of propylene oxide were metered into the autoclave at a stirrer speed of 800 rpm over a period of 3.0 h. The metered addition was started at a pressure of 0.05 bar, toward the end of the metering phase, the reactor pressure reached 2.35 bar. After a further reaction time of 9 h, the product was heated at 105° C. under reduced pressure for 0.5 h; after cooling down to 40° C., 146.054 g of a 2.161% by weight aqueous sulfuric acid solution were added and the mixture was stirred for 0.5 h. The product was then dewatered in a water-jet vacuum at 40° C. and filtered through a depth filter (T 750, from Seitz). The filtrate was then heated at 110° C. and 1 mbar for another 3 h. Finally, 0.5808 g of Irganox® 1076 was added at 80° C. The OH number of the product was 291 mg KOH/g and the viscosity at 25° C. was 181 mPas.

Polyether polyol A: glycerol-started polypropylene oxide polyol having a functionality of 3 and an OH number of 400 mg KOH/g and a viscosity of 375 mPas (at 25° C.).

Polycat® SA 1/10: product from Air Products. Phenol salt of 1,8-diazabicyclo[5.4.0]undec-7-ene in dipropylene glycol. The OH number was 83 mg KOH/g.

Isocyanate: MDI blend, mixture of diphenylmethane 4,4'-diisocyanate (MDI) with isomers and higher-functionality homologs, containing 0.1% by weight of acetylacetone and an NCO content of 32.8% by weight; viscosity at 25° C.: 20 mPas. The mixture contains about 66% by weight of diphenylmethane 4,4'-diisocyanate, 21% by weight of diphenylmethane 2,4'-diisocyanate, 2% by weight of diphenylmethane 2,2'-diisocyanate and 11% by weight of higher-functionality homologs of MDI.

Production of the Shaped Bodies

In order to determine the matrix properties, shaped bodies (sheets) were produced from various PUR/PIR systems and compared. The polyol mixtures comprising the trimerization catalyst were degassed at a pressure of 1 mbar for 60 minutes and then the isocyanate was added. This blend was degassed at a pressure of 1 mbar for about 5 minutes and then poured into sheet molds. The sheets were cast at room temperature and subjected to heat treatment in a drying cabinet heated to 80° C. overnight. The thickness of the sheets was 4 mm. Optically transparent sheets were obtained. The amounts and properties can be found in table 1.

The sheets were used to produce specimens for a tensile test according to DIN EN ISO 527, and the modulus of elasticity and strength was determined.

The heat distortion resistance (heat deflection temperature—HDT) was determined in accordance with DIN EN ISO 75 1/75 2004—Method A with a flexural stress of 1.8 N/mm$^2$ and a heating rate of 120 K/h.

OH number and viscosity: The OH number was determined according to the method of DIN 53240. The viscosity was determined by means of a rotary viscometer (Physica MCR 51, manufacturer: Anton Paar) by the method of DIN 53019 (spindle type CC27, shear rate range 16-128 l/s).

The viscosity of the reaction mixture was determined directly after the mixing and 60 minutes after the mixing of the components at a constant temperature of 25° C. with a rotary viscometer at a shear rate of 60/s.

All amounts in the following table are in parts by weight.

TABLE 1

|  | Example 1 | Example 2 | Example 3 | Comparative example 4 | Comparative example 5 | Comparative example 6 |
|---|---|---|---|---|---|---|
| Polyether ester polyol 1 | 26 | 13 | 19.5 | — | — | — |
| Polyether polyol A |  | 13 | 6.5 | 26 | 26 | 26 |
| Polycat SA 1/10 | 0.5 | 0.5 | 0.5 | 0.5 | 0.5 | 0.5 |
| Isocyanate | 73.5 | 73.5 | 73.5 | 83.4 | 100.8 | 73.5 |
| NCO index | 5.81 | 3.57 | 3.87 | 3.50 | 4.23 | 3.08 |
| Properties |  |  |  |  |  |  |
| HDT [° C.] | 111.1 | 96.1 | 87.8 | 76.5 | 73.1 | 73.1 |
| Viscosity directly after mixing at 25° C. [mPas] | 80 | 55 | 52 | 47 | 44 | 58 |
| Viscosity 60 min after mixing at 25° C. [mPas] | 391 | 253 | 237 | 274 | 255 | 441 |

TABLE 1-continued

|  | Example 1 | Example 2 | Example 3 | Comparative example 4 | Comparative example 5 | Comparative example 6 |
|---|---|---|---|---|---|---|
| Tensile test: Modulus of elasticity [MPa] | 2609 | 2820 | 2686 | 3140 | 2949 | 3117 |
| Tensile test: Strength [MPa] | 75 | 78.4 | 74.4 | 40.7 | 47.5 | 76 |
| Tensile test: Elongation at break [%] | 5.8 | 5.0 | 5.7 | 1.4 | 1.8 | 4.6 |

The inventive examples in table 1 show a slow rise in viscosity, which is advantageous for the production of large components, since it is considered to be an indicator of a long processing window. Compact and optically transparent components were obtained with good mechanical properties such as a modulus of elasticity exceeding 2600 MPa, a strength exceeding 74 MPa and the elongation at break exceeding 5%. Surprisingly, the shaped bodies produced according to examples 1 to 3, in spite of a lower OH number of the polyols/polyol mixtures used, have much higher heat distortion resistances (HDT values) than the specimens produced according to comparative examples 4 to 6.

The compositions according to example 1 and comparative example 4 were used to produce glass fiber-reinforced PUR/PIR materials by the vacuum infusion methods.

For this purpose, two laminas of a UD glass scrim (basis weight of glass 1040 g/m² per lamina), then a piece of balsa wood (dried under reduced pressure at 105° C. overnight), two more laminas of a UD glass scrim (basis weight of glass 1040 g/m² per lamina) and a "green mesh" as flow aid were applied to a mold, sealed with a vacuum film and evacuated. Then the composition from example 1 which had been degassed for about 5 minutes beforehand was sucked in. Once the mold had been filled, the component was heat-treated at 80° C. overnight.

A compact and optically transparent component was obtained.

Table 2 shows that bubble formation, which can arise as a result of the reaction of moisture with the isocyanate, in an experiment with the composition from example 1 is lower than in an experiment with the composition from comparative example 6 under the same processing conditions.

TABLE 2

|  | Example 7 | Comparative example 8 |
|---|---|---|
| Polyether ester 1 | 26 | — |
| Polyether polyol A | — | 26 |
| Polycat SA 1/10 | 0.5 | 0.5 |
| MDI blend | 73.5 | 73.5 |
| Visual impression | little bubble formation | bubble formation |

The simple addition of different proportions of soybean oil to the polyol component leads to phase separation in the polyol formulation (see table 3). Such hydrophobized polyols are therefore unsuitable for use as a reaction mixture for VARTM.

TABLE 3

|  | Comparative example 9 | Comparative example 10 | Comparative example 11 | Comparative example 12 |
|---|---|---|---|---|
| Polyether polyol A | 30 | 20 | 40 | 55 |
| Soybean oil | 30 | 40 | 20 | 5 |
| Phase stability | no | no | no | no |

The invention claimed is:

1. A fiber composite component comprising:
a fiber layer comprising polyurethane/polyisocyanurate, wherein the polyurethane/polyisocyanurate comprises a reaction product of a reaction mixture comprising:
A) an isocyanate component and
B) a polyol component;
wherein the polyol component B) comprises at least one hydrophobic polyol, wherein the at least one hydrophobic polyol is a polyether ester polyol comprising fatty acid ester residues having no free OH groups and having a content of fatty acid residues of 5% to 85% by weight, based on the total weight of the poly ether ester polyol and wherein the polyether ester polyol comprises a base-catalyzed reaction product of reactants comprising:
starter compounds having Zerewitinoff-active hydrogen atoms and
alkylene oxides in the presence of fatty acid esters.

2. A method for producing composite components, comprising:
a) providing a laminar structure comprising a core, and a fiber fabric;
b) contacting the laminar structure with a reaction mixture comprising:
A) an isocyanate component; B) a polyol component; and
c) curing the reaction mixture;
wherein the polyol component comprises at least one hydrophobic polyol wherein the at least one hydrophobic polyol is a polyether ester polyol comprising fatty acid ester residues having no free OH groups and having a content of fatty acid residues of 5% to 85% by weight, based on the total weight of the poly ether ester polyol and
wherein the polyether ester polyol comprises a base-catalyzed reaction product of
reactants comprising:
starter compounds having Zerewitinoff-active hydrogen atoms and
alkylene oxides in the presence of fatty acid esters.

3. The method for producing composite components as claimed in claim 2, wherein the reaction mixture is at a constant temperature of 25° C., 60 minutes after mixing, and has a viscosity of 50 to 500 mPas.

4. The method for producing composite components as claimed in claim 2, wherein the NCO index is from ≥1.10 to ≤10.00.

5. The method for producing composite components as claimed in claim 2, wherein the core, at least in sections, directly adjoins the fiber fabric layer including polyurethane/polyisocyanurate, wherein the core comprises a core material selected from the group consisting of wood, polyvinyl chloride (PVC) foam, polyester (PET) foam, and polyurethane (PUR) foam, and wherein the core has a water content of ≥0.5% by weight to ≤30% by weight.

6. The method for producing composite components as claimed in claim 2, wherein step b) is conducted by a vacuum infusion method.

7. A rotor blade for wind turbines comprising a laminar structure having the following layers:
a core layer; and
a fiber layer comprising the fiber composite component as claimed in claim 1.

8. The fiber composite component as claimed in claim 1, further comprising a core layer.

9. The fiber composite component as claimed in claim 1, wherein the at least one hydrophobic polyol of polyol component B) comprises an oleochemical polyol.

10. The fiber composite component as claimed in claim 1, wherein the reaction mixture further comprises:
C) additives.

11. The method for producing composite components as claimed in claim 2, wherein the laminar structure comprises a flow aid.

12. The method for producing composite components as claimed in claim 2, wherein the at least one hydrophobic polyol comprises an oleochemical polyol.

* * * * *